(12) United States Patent
Mitsuzawa

(10) Patent No.: US 9,695,327 B2
(45) Date of Patent: Jul. 4, 2017

(54) INK COMPOSITION

(71) Applicant: Seiko Epson Corporation, Tokyo (JP)

(72) Inventor: Kana Mitsuzawa, Kyoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/969,379

(22) Filed: Dec. 15, 2015

(65) Prior Publication Data

US 2016/0185989 A1    Jun. 30, 2016

(30) Foreign Application Priority Data

Dec. 16, 2014   (JP) ................ 2014-253836

(51) Int. Cl.
*C09D 11/023* (2014.01)
*C09D 11/30* (2014.01)
*C09D 11/322* (2014.01)
*C09D 11/08* (2006.01)

(52) U.S. Cl.
CPC .......... *C09D 11/322* (2013.01); *C09D 11/023* (2013.01); *C09D 11/08* (2013.01)

(58) Field of Classification Search
CPC .............................. C09D 11/30; C09D 11/023
See application file for complete search history.

(56) References Cited

U.S. PATENT DOCUMENTS

| 8,226,756 | B2 * | 7/2012 | Akiyama | ............. | C09D 11/322 106/31.25 |
| 2010/0165020 | A1 * | 7/2010 | Tojo | ..................... | B41J 2/14233 347/9 |
| 2013/0074727 | A1 | 3/2013 | Ando et al. | | |

FOREIGN PATENT DOCUMENTS

| JP | 11-166143 A | 6/1999 |
| JP | 2013-072056 A | 4/2013 |

* cited by examiner

*Primary Examiner* — Veronica F Faison
(74) *Attorney, Agent, or Firm* — Harness, Dickey & Pierce, P.L.C.

(57) ABSTRACT

An ink composition for ink jet recording includes: a first phase containing a pigment, a cellulose derivative, and water; and a second phase containing an organic solvent having a 50% distillation point of 280° C. or lower, in which the content of the cellulose derivative in the first phase is 3 mass % to 15 mass % with respect to the total mass of the first phase.

16 Claims, No Drawings

INK COMPOSITION

TECHNICAL FIELD

The present invention relates to an ink composition for ink jet recording.

BACKGROUND ART

Conventionally, a printing method using an ink jet recording system is performed by flying ink droplets to deposit the ink droplets onto a recording medium, such as paper. Further, in recent years, with the advance of an ink jet recording system technology, an ink jet recording apparatus using an ink jet recording system has been used, even in the field of high-definition image recording (image printing) having used photographic or offset printing.

Ink jet recording, for example, as disclosed in JP-A-11-166143, is even used in dyeing (printing) a fabric. It is disclosed in the technology described in JP-A-11-166143 that, when the printing of a fabric is performed by an ink jet system, thixotropic properties are imparted by adding a salt of carboxymethyl cellulose to ink, and image sharpening is obtained by reducing the bleeding of edges of a pattern formed on the fabric.

However, generally, an ink jet ink used in ink jet recording is required to decrease the viscosity thereof to some degree in order to fly ink droplets by ejecting the ink droplets from thin ink flow channels or fine nozzles. Therefore, in the case of blending a polymer compound with the ink, when increasing the blending amount or molecular weight of the polymer compound in order to exhibit desired performance, there were cases where the viscosity of the ink increased.

Further, generally, in the case of an ink containing a pigment, a polymer compound is added for the purpose of dispersion of the pigment or for the purpose of improving the fixability of the pigment onto a medium, in addition to being added to suppress the bleeding of the ink. Therefore, even in the case of blending the polymer compound for fixing the pigment, the polymer compound is selected in consideration of the kind and blending amount thereof such that the viscosity of the ink does not excessively increase.

Meanwhile, it has been found that good surface gloss can be obtained when applying a cellulose-based polymer onto a medium, such as paper, composed of cellulose as a main component, and that good pigment fixability can be expected when blending the cellulose-based polymer with an aqueous pigment ink. However, as described above, from the request of suppressing the viscosity of the ink, it has been difficult to blend the cellulose-based polymer with the aqueous pigment ink in a high content.

One object according to some aspects of the present invention is to provide an ink composition for ink jet recording, which can be stably ejected by an ink jet recording apparatus, and which can exhibit good pigment fixability, high-quality recording, and good storage stability.

SUMMARY

The present invention has been made to solve at least a part of the above-described problem, and can be realized in the following aspects or application examples.

An ink composition for ink jet recording according to an aspect of the present invention includes: a first phase containing a pigment, a cellulose derivative, and water; and a second phase containing an organic solvent having a 50% distillation point of 280° C. or lower, in which the content of the cellulose derivative in the first phase is 3 mass % to 15 mass % with respect to the total mass of the first phase.

The ink composition can be stably ejected by an ink jet recording apparatus by combining a high-viscosity aqueous pigment ink (first phase) containing 3 mass % to 15 mass % of the cellulose derivative with the second phase containing an organic solvent. Further, the fixability of a pigment is made good, and thus high-quality recording can be performed. Moreover, the ink composition can stably maintain an emulsion form or dispersion form, and is thus excellent in storage stability.

Here, the 50% distillation point refers to a value by JIS K2254 "fuel oil distillation test method".

The cellulose derivative may be at least one selected from carboxymethyl cellulose and salts thereof, hydroxyethyl cellulose, hydroxypropyl cellulose, and methyl cellulose.

According to the ink composition, it is possible to obtain better pigment fixability and gloss when the ink composition adheres to a medium.

The ratio of the first phase to the total of the first phase and the second phase may be 20 mass % to 60 mass %.

The ink composition can further stably maintain an emulsion form or dispersion form, and is thus excellent in storage stability.

The second phase may contain an organic solvent having a 50% distillation point of 300° C. or higher.

In the ink composition, the volatilization of the organic solvent is easily suppressed, and it is more difficult to generate odors or the like.

The number average molecular weight of the entire cellulose derivative may be 10,000 to 150,000.

In the ink composition, pigment fixability and ejection stability becomes very good.

Here, the number average molecular weight is determined by a GPC method (gel permeation chromatography) using polyethylene oxide as a standard.

The etherification degree of the entire cellulose derivative may be 0.6 to 1.0.

In the ink composition, a strong and smooth film can be formed, and the fixability of a pigment to a medium is further excellent.

Here, the etherification degree refers to an average value of all of the etherified cellulose derivative molecules per glucose unit of the cellulose derivative.

DETAILED DESCRIPTION

Hereinafter, preferable embodiments of the invention will be described. The following embodiments describe an example of the invention. The invention is not limited to the following embodiments. Various modifications can be made within the scope without departing from the gist thereof. All of the components to be described below may not be essential components of the invention.

1. Ink Composition

The ink composition according to the present embodiment is an ink composition for ink jet recording. The ink composition is configured to include a first phase and a second phase. In the ink composition according to the present embodiment, the first phase and the second phase, for example, are a water phase and an oil phase, and both exist in phase separation.

The phase separation structure in the ink composition of the present embodiment is not particularly limited, and examples thereof include a structure in which the second phase is used as a mother phase (matrix) and the first phase is used as a dispersed phase (domain) (for example, water-in-oil structure (W/O)) and a structure in which the first phase is used as a matrix and the second phase is used as a domain (for example, oil-in-water structure (O/W)). In addition, the phase separation structure in the ink composition of the present embodiment may be a hierarchical phase separation structure, such as a structure in which the second phase is used as a matrix, the first phase is used as a dispersed phase domain, and the second phase exists in the domain (for example, oil-in-water-in-oil structure (O/W/O), called a composite emulsion), or a structure in which both the first phase and the second phase are matrixes, called a co(mutual) continuous structure.

Further, the phase separation structure in the ink composition of the present embodiment is stably maintained by the cellulose derivative to be described below. Here, the meaning that the phase separation structure is stably maintained indicates that the phase separation structure formed in the ink composition is maintained for a predetermined period of time in the case where the ink composition is stored at room temperature. The storage stability of such an ink composition can be confirmed by measuring the temporal change of laser scattered light or absorbance, in addition to visual observation.

In the present specification, since the first phase and second phase contained in the ink composition form a phase separation structure, for example, even in the case where a solid component, such as a pigment, is contained, the phase separation structure is referred to as W/O emulsion. Hereinafter, an example in which the first phase contained in the ink composition of the present embodiment is water-based and the second phase contained therein is oil-based will be described in detail. Therefore, in the present specification, the first phase and the second phase are referred to as W phase and O phase, respectively.

1.1. First Phase

The first phase contained in the ink composition of the present embodiment contains a pigment, a cellulose derivative, and water. The first phase forms a phase separation state at normal temperature and pressure together with the second phase which will be described later.

1.1.1. Pigment

In the ink composition of the present embodiment, the first phase contains a pigment. The kind of the pigment is not particularly limited, and one or more kinds of pigment that can be contained in a general ink jet ink can be used.

As the pigment, any of inorganic and organic pigments can be used. Examples of the pigment can include organic pigments (brilliant carmine 6B, lake red C, watching red, disazo yellow, hansa yellow, phthalocyanine blue, phthalocyanine green, alkali blue, aniline black, and the like), such as azo-based pigments, phthalocyanine-based pigments, condensed polycyclic pigments, nitro-based pigments, nitroso-based pigments, hollow resin particles, and polymer particles; metals, such as cobalt, iron, chromium, copper, zinc, lead, titanium, vanadium, manganese, and nickel; metal oxides and sulfides, such as titanium oxide, zinc oxide, antimony oxide, zinc sulfide, and zirconium oxide; carbon blacks (C. I. pigment black 7), such as furnace carbon black, lamp black, acetylene black, and channel black; and inorganic pigments, such as yellow ocher, ultramarine blue, and prussian blue.

More specifically, examples of the carbon blacks include No. 2300, No. 900, MCF88, No. 33, No. 40, No. 45, No. 52, MA7, MA8, MA100, and No. 2200B (all, manufactured by Mitsubishi Chemical Corporation); Raven 5750, Raven 5250, Raven 5000, Raven 3500, Raven 1255, and Raven 700 (all, manufactured by Columbia Carbon Co. Ltd.); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all, manufactured by Cabot Corporation); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all, manufactured by Degussa AG).

Examples of white pigment include C. I. Pigment Whites 1 (basic lead carbonate), 4 (zinc oxide), 5 (a mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gloss White), 24 (alumina White), 25 (gypsum), 26 (magnesium oxide·silicon oxide), 27 (silica), and 28 (calcium silicate anhydride).

Examples of yellow pigment include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigment include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violets 19, 23, 32, 33, 36, 38, 43, and 50.

Examples of cyan pigment include C. I. Pigment Blues 1, 2, 3, 15, 15:1, 15:2, 15:3, 15:34, 15:4, 16, 18, 22, 25, 60, 65, and 66; and C. I. Bat Blues 4 and 60.

Examples of pigments other than black, white, yellow, magenta, and cyan pigments include C. I. Pigment Greens 7 and 10; C. I. Pigment Browns 3, 5, 25, and 26; and C. I. Pigment Oranges 1, 2, 5, 7, 13, 14, 15, 16, 24, 34, 36, 38, 40, 43, and 63.

Further, characteristic pigments can also be used. For example, photoluminescent pigments capable of forming a metallic luster image by containing aluminum flake or the like and forming a pearl luster image by containing talc or the like may be used. Moreover, the pigment used in the present embodiment may be a self-dispersion type pigment, and may also be a dye containing a solid component, such as a dispersion dye or a sublimation dye.

The content of the pigment in the first phase is not particularly limited, but is 2 mass % to 50 mass %, and preferably 3 mass % to 30 mass %. The content of the pigment (solid content) varies depending on the kinds of the pigment used, but, from the viewpoint of obtaining good color developing properties, the content thereof is preferably 1 mass % to 30 mass %, and more preferably 2 mass % to 15 mass % when the total mass of the ink composition is set to 100 mass %.

Meanwhile, at the time of preparing the ink composition, the first phase may be prepared using a pigment dispersion obtained by preliminarily dispersing the pigment. As the method of obtaining such a pigment dispersion, there are a method of dispersing a pigment in a dispersion medium using a polymer dispersant, a method of dispersing a self-dispersing pigment in a dispersion medium without using a dispersant, and a method of dispersing a surface-treated pigment in a dispersion medium.

1.1.2. Cellulose Derivative

In the ink composition of the present embodiment, the first phase contains a cellulose derivative.

The kind of the cellulose derivative is not particularly limited. Examples of the cellulose derivative include cellulose ethers, cellulose esters, and alkali metal salts thereof, such as a sodium salt and a potassium salt, and ammonium salts thereof.

Specific examples of the cellulose ethers include one or more selected from carboxymethyl cellulose (CMC), carboxyethyl cellulose, carboxymethyl ethyl cellulose, and sodium salts and potassium salts thereof, hydroxymethyl cellulose, hydroxyethyl cellulose (HEC), hydroxypropyl cellulose, methyl cellulose, ethyl cellulose, methoxymethyl cellulose, benzyl cellulose, and mixtures and copolymers thereof.

Specific examples of the cellulose esters include one or more selected from cellulose nitrate, cellulose sulfate, cellulose acetate, cellulose propionate, cellulose butyrate, and other higher fatty acid celluloses.

Carboxymethyl cellulose sodium, which is a sodium salt of carboxymethyl cellulose, is, for example, an alkali cellulose with sodium hydroxide obtained by using natural pulp as a raw material, and is obtained by etherification with monochloroacetic acid. As the preparation method thereof, there are a solvent method and a water medium method.

These cellulose derivatives have hydrophilicity, and some or all of molecules thereof are dissolved in water contained in the first phase. Further, since these cellulose derivatives have a hydrophobic group and a hydrophilic group, they exhibit effects similar to those of a surfactant, and are disposed at the interface of the first phase and the second phase in some cases.

Further, since the cellulose derivative has a cellulose skeleton (structure bound by β-glucose(glucopyranose)-1,4-bonding), it has high affinity with cellulose fibers contained in recording media, such as paper, or fabrics containing cotton. Therefore, it is possible to satisfactorily bind the cellulose fibers. Moreover, since the cellulose derivative has interfacial action, it also has an effect of dispersing a pigment in water, and thus it is possible to satisfactorily fix the pigment to the cellulose fibers.

Among such cellulose derivatives, in terms of being able to obtain better pigment fixability and gloss at the time of adhering to a medium, at least one selected from carboxymethyl cellulose (CMC), hydroxyethyl cellulose (HEC), hydroxypropyl cellulose, and methyl cellulose is more preferable.

The content of the cellulose derivative in the first phase is 3 mass % to 15 mass % with respect to the total mass of the first phase. When the content of the cellulose derivative is within this range, the viscosity of the ink composition can be easily adjusted to a range suitable for ink jet recording, and the ejection stability of the ink composition in ink jet recording can be improved.

The properties of the cellulose ether are changed by polymerization degree and etherification degree in a unit of anhydrous glycol. The etherification degree (substitution degree per glucose unit) of the cellulose ether (all, in the case where a plurality of kinds of cellulose ethers are contained), from the viewpoint of being able to increase the fixability of a pigment and form a strong and smooth film to recording media, is preferably 0.01 to 4.0, more preferably 0.1 to 2.8, and still more preferably 0.6 to 1.0. The etherification degree is an average value of all of the etherified cellulose ethers per glucose unit of the cellulose ether. Here, for example, in the case of carboxymethylcellulose sodium, the etherification degree is a value obtained according to CMC Industry Association spectrometry (ashing method). Specifically, the etherification degree can be obtained by precisely weighing 1 g of carboxymethylcellulose sodium, putting the carboxymethylcellulose sodium into a magnetic crucible, and ashing this carboxymethylcellulose sodium at 600° C. to produce sodium oxide, titrating the sodium oxide with N/10 sulfuric acid using phenolphthalein as an indicator, and putting the titer Y mL per 1 g of carboxymethylcellulose sodium into the following Equation to calculate the etherification degree.

$$\text{Etherification degree} = (162 \times Y)/(10{,}000 - 80 \times Y)$$

The number average molecular weight of the cellulose derivative is 1,000 to 5,000,000, preferably 3,000 to 1,000,000, more preferably 5,000 to 500,000, and still more preferably 10,000 to 150,000, in the case where it was measured by a GPC method (gel permeation chromatography) using polyethylene oxide as a standard. From the viewpoint of the fixability of a pigment to paper and the ejection stability of the ink composition being made better, it is more preferable that the number average molecular weight of the cellulose derivative (all, in the case where a plurality of kinds of cellulose ethers are contained) is 10,000 to 50,000.

1.1.3. Water

The first phase of the ink composition of the present embodiment contains water. As the water, pure water, such as ion-exchanged water, ultrafiltered water, reverse osmosis water, or distilled water, or ultrapure water can be used. The content of the water in the first phase is 20 mass % to 70 mass % when the total mass of the first phase was set to 100 mass %. Here, the content of the water is not limited to the amount of the water added, and includes the amount of water in other additives and the amount of water contained in a pigment dispersion in the case where a pigment is supplied as a dispersion.

1.1.4. Other Components

The first phase according to the present embodiment may contain one or more kinds of additives that can be contained in a general ink jet ink, such as a surfactant, a water-soluble organic solvent, a resin, a preservative, a pH adjuster, a dissolution aid, an antioxidant, and an antifungal agent.

1.1.4.1. Surfactant

The first phase of the ink composition of the present embodiment may contain a surfactant. The surfactant may be directly added to the first phase, and may also be a surfactant contained in a pigment dispersion in the case where a pigment is added to the first phase as the pigment dispersion. As the surfactant, any of a nonionic surfactant, an anionic surfactant, a cationic surfactant, and an amphoteric surfactant can be used. These surfactants may be used in combination.

As the nonionic surfactant, at least one of an acetylene glycol-based surfactant, an acetylene alcohol-based surfactant, a fluorine-based surfactant, and a polysiloxane-based surfactant is preferable.

The above-described acetylene glycol-based surfactant and acetylene alcohol-based surfactant are not limited to below, but examples thereof can include one or more selected from 2,4,7,9-tetramethyl-5-decyne-4,7-diol and alkylene oxide adducts of 2,4,7,9-tetramethyl-5-decyne-4,7-diol; and 2,4-dimethyl-5-decyne-4-ol and alkylene oxide adducts of 2,4-dimethyl-5-decyne-4-ol, 3,6-dimethyl-4-octyne-3,6-diol, 3,5-dimethyl-1-hexyne-3-ol, and 2,4-dimethyl-5-hexyne-3-ol. Further, as the acetylene glycol-based surfactant and acetylene alcohol-based surfactant, commercially-available products can also be used. Examples of the commercially-available products include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (all trade names, manufactured by Air Products and Chemicals. Inc.); Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Co., Ltd.); and Acetylenol E00, E00P, E40, and E100 (all trade names, manufactured by Kawaken Fine Chemical Co., Ltd.).

As the fluorine-based surfactant, commercially-available products may be used. Examples of the commercially-available products include Megafac F-479 (manufactured by DIC Corporation), and BYK-340 (manufactured by BYK Japan KK).

As the polyorganosiloxane-based surfactant, commercially-available products can be used. Examples of the commercially-available products include Olfine PD-501, Olfine PD-502, and Olfine PD-570 (all, manufactured by Nissin Chemical Co., Ltd.); and BYK-347 and BYK-348 (all, manufactured by BYK Japan KK).

Examples of the nonionic surfactant may include polyoxyethylene alkyl ethers, polyoxyethylene alkyl phenyl ether, alkyl glucosides, polyoxyalkylene glycol alkyl ethers, polyoxyalkylene glycols, polyoxyalkylene glycol alkyl phenyl ethers, sucrose fatty acid esters, polyoxyethylene fatty acid esters, polyoxyethylene sorbitan fatty acid esters, sorbitan fatty acid esters, polyoxyalkylene acetylene glycols, polyoxyalkylene glycol alkyl amines, polyoxyethylene alkyl amines, polyoxyethylene alkyl amine oxides, fatty acid alkanolamides, alkylolamides, and polyoxyethylene polyoxypropylene block polymers.

Examples of the anionic surfactant include higher fatty acid salts, soaps, α-sulfofatty acid methyl ester salts, linear alkyl benzene sulfonates, alkyl sulfates, alkyl ether sulfate ester salts, monoalkyl phosphate ester salts, α-olefin sulfonate, alkyl benzene sulfonates, alkylnaphthalene sulfonates, naphthalene sulfonates, alkane sulfonates, polyoxyethylene alkyl ether sulfates, sulfosuccinic acid salts, and polyoxyalkylene glycol alkyl ether phosphate ester salts.

Examples of the cationic surfactant include quaternary ammonium-based surfactants, such as alkyl trimethyl ammonium salts, dialkyl dimethyl ammonium salts, and alkyl dimethyl benzyl ammonium salts; and amine salt-based surfactants, such as N-methyl-bis-hydroxyethylamine fatty acid ester hydrochlorides.

Examples of the amphoteric surfactant include amino acid-based surfactants, such as alkyl amino fatty acid salts; a betaine-based surfactant, such as alkyl carboxyl betaine; and amine oxide-based surfactants, such as alkylamine oxides. The amphoteric surfactant is not limited thereto.

In the case where the surfactant is combined with the first phase, it is preferable that the total content of the surfactant is 0.1 mass % to 3 mass % when the total mass of the first phase was set to 100 mass %.

1.1.4.2. Water-Soluble Organic Solvent

The first phase of the ink composition according to the present embodiment may contain a water-soluble organic solvent. As the water-soluble organic solvent, preferably, alkyl ethers of polyhydric alcohols (glycol ethers) and 1,2-alkanediols are exemplified. Examples of the glycol ethers include, but are not limited to, alkylene glycol monoalkyl ethers, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether. Further, examples of the 1,2-alkanediols include, but are not limited to, 1,2-pentanediol and 1,2-hexanediol. In addition to these, diols of straight-chain hydrocarbons, such as 1,3-propanediol, 1,4-butanediol, 1,5-pentanediol, 1,6-hexanediol, 1,7-heptane diol, and 1,8-octanediol, can be exemplified.

Specific examples of the water-soluble organic solvent can also include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, trimethylolpropane, polyethylene glycol having a number average molecular weight of 2000 or less, 1,3-propylene glycol, isopropylene glycol, isobutylene glycol, glycerin, mesoerythritol, pentaerythritol, 2-pyrrolidone, N-methyl-2-pyrrolidone, and N-ethyl-2-pyrrolidone.

The water-soluble organic solvents may be used alone, and may also be used in combination of two or more thereof. When the first phase contains the water-soluble organic solvent, for example, even when the ink composition is left in a state where it is exposed to air, this ink composition can be more difficult to dry. As the water-soluble organic solvent, a water-soluble organic solvent having a standard boiling point of preferably 180° C. or higher, and more preferably 200° C. or higher may be used. In the case where the standard boiling point thereof is within this range, good water retentivity and wettability can be imparted to the ink composition, and the storage stability of the ink composition can be improved in some cases.

In the case where the water-soluble organic solvent is combined with the first phase, the content of the water-soluble organic solvent is preferably 0.1 mass % to 50 mass %, and more preferably 0.5 mass % to 40 mass %, when the total mass of the first phase was set to 100 mass %. When the first phase contains the water-soluble organic solvent, since the surface tension becomes low compared to the case where the first phase contains only water, the wettability to media such as paper become high. Therefore, the fixability of a pigment can be improved in some cases.

1.1.4.3. Resin

The first phase may contain a resin in addition to the above-described CMC, as a polymer component. The resin may be supplied in the form of resin emulsion, and may also be supplied in a state of being combined with a pigment dispersion. The resin may function as a polymer dispersant of a pigment. Further, the resin may be added for the purpose of increasing the fixability of ink (pigment) and increasing the rapidness of printing.

Examples of the resin components contained in the resin emulsion include, but are not limited to, urethane resins, styrene acrylic resins, and acrylic resins. In the pigment dispersion, a resin emulsion containing one or more of these resin components can be used.

The urethane resin is not particularly limited as long as it has a urethane bond in the molecule. However, a polyether type urethane resin having an ether bond in the main chain in addition to the urethane bond, a polyester type urethane resin having an ester bond in the main chain in addition to the urethane bond, or a polycarbonate type urethane resin having a carbonate bond in the main chain in addition to the urethane bond can be used.

As the resin component contained in the resin emulsion, a self-reactive urethane resin, a self-reactive styrene acrylic resin, or a self-reactive acrylic resin may be used. As the self-reactive resin, there are exemplified a urethane resin blocked with a blocking agent having a hydrophilic group, a blocked urethane resin obtained by imparting a hydrophilic segment, and an acrylic resin obtained by copolymerizing acrylic monomers having functional groups, such as a carboxyl group, a hydroxyl group, an amino group, and a methylol group.

Examples of commercially-available products of the urethane resin emulsion include Sancure 2710 (manufactured by Nippon Lubrizol Corporation); Pamarin UA-150 (manufactured by Sanyo Chemical Industries, Ltd.); Superflex 150, 420, 460, 470, 610, and 700 (all, manufactured by DKS Co., Ltd.); NeoRez R-9660, R-9637, and R-940 (all, manufactured by Kusumoto Chemicals, Ltd.); Adekabontighter HUX-380 and 290K (all, manufactured by ADEKA Corporation); and Takelac (R) W-605, W-635, and WS-6021 (all, manufactured by Mitsui Chemicals, Inc.).

Examples of commercially-available products of the styrene acrylic resin or acrylic resin include Movinyl 966A and Movinyl 7320 (manufactured by Nippon Synthetic Chemical Industry Co., Ltd.); Microgel E-1002 and Microgel E-5002 (all, manufactured by Nippon Paint Co., Ltd.); Boncoat 4001 and Boncoat 5454 (all, manufactured by DIC, Corporation); SAE1014 (manufactured by Nippon Zeon Corporation); Saivinol SK-200 (manufactured by Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (all, manufactured by BASF Corporation); and NK binder R-5HN (Shin-Nakamura Chemical Co., Ltd.).

The content of the resin emulsion (solid content) in the first phase is preferably 0.1 mass % to 10 mass %, and more preferably 0.3 mass % to 5 mass %, when the total mass of the first phase was set to 100 mass %.

1.2. Second Phase

The second phase of the ink composition of the present embodiment contains an organic solvent having a 50% distillation point of 280° C. or lower. The second phase forms a phase separation state together with the first phase in the ink composition. In the present embodiment, the first phase is a water phase, and the second phase is an oil phase. The second phase contains such an organic solvent, thereby decreasing the viscosity of the ink composition.

Here, the 50% distillation point refers to a value by JIS K2254 "fuel oil distillation test method". Schematically, the 50% distillation point is a temperature at which the solvent in the container is evaporated by 50% under normal pressure. When the 50% distillation point is low, the amount of evaporation of the organic solvent is relatively large, and, when the 50% distillation point is high, the amount of evaporation of the organic solvent is relatively small.

1.2.1 Organic Solvent

The organic solvent having a 50% distillation point of 280° C. or lower contained in the second phase may be a polar organic solvent, a nonpolar organic solvent, or a mixed solvent thereof.

Examples of the organic solvent having a 50% distillation point of 280° C. or lower can include "AF-4, AF-7, Naphtesol M, Naphtesol L, Teclean N-16, Teclean N-20, Teclean N-22, 0 grade Solvent L, 0 grade Solvent M, 0 grade Solvent H, Isosol 300, Isosol 400, and Cleansol G", manufactured by Nippon Oil Corporation; and "ExxolD80, Solvesso 200, Isopar M, and Isopar L", manufactured by Exxon Corporation.

The organic solvent having a 50% distillation point of 280° C. or lower may be selected from an ester-based solvent, an alcohol-based solvent, a higher fatty acid-based solvent, an ether-based solvent, and mixed solvents thereof. Specifically, the organic solvent having a 50% distillation point of 280° C. or lower can be selected among diethylene glycol monobutyl ether, ethylene glycol monobutyl ether, propylene glycol monobutyl ether, and propylene glycol dibutyl ether, each of which has a 50% distillation point of 280° C. or lower.

The organic solvents having a 50% distillation point of 280° C. or lower can be suitably used alone or by appropriately selecting two or more thereof. In the case where two or more kinds of organic solvents having a 50% distillation point of 280° C. or lower are used, when the organic solvents having a 50% distillation point of 280° C. or lower are used in an amount of at least 10 mass % or more with respect to the total amount of all the organic solvents, an organic solvent having a 50% distillation point of higher than 280° C. may be contained. When the organic solvents having a 50% distillation point of 280° C. or lower are used in an amount of 10 mass % or more with respect to the total amount of the second phase, it is difficult for a solvent to remain in media such as paper, and it is possible to reduce bleed-through·oil bleeding.

Examples of the organic solvent having a 50% distillation point of higher than 280° C. can include "Naphtesol H and Isosol AF-6", manufactured by Nippon Oil Corporation; "ExxolD40, ExxolD100, ExxolD130, and ExxolD140", manufactured by Exxon Corporation; and "Cleansol G" (alkyl benzene), manufactured by Nippon Oil Corporation.

Meanwhile, the second phase of the ink composition of the present embodiment may contain an organic solvent having a 50% distillation point of 300° C. or higher. The organic solvent having a 50% distillation point of 300° C. or higher can be selected from among soybean oil methyl, soybean oil isobutyl, ethyl oleate, isostearyl alcohol, oleyl alcohol, isopalmitic acid, isostearic acid, isoarachic acid, isohexaconic acid, isopropyl isostearate, methyl linoleate, isobutyl linoleate, and tall oil isobutyl, each of which has a 50% distillation point of 300° C. or higher.

The organic solvents having a 50% distillation point of 300° C. or higher can be suitably used alone or by appropriately selecting two or more thereof. In the case where two or more kinds of organic solvents having a 50% distillation point of 300° C. or higher are used, when the organic solvents having a 50% distillation point of 300° C. or higher are used in an amount of at least 10 mass % or more with respect to the total amount of the second phase, an organic solvent having a 50% distillation point of lower than 300° C. may be contained.

When the second phase contains the organic solvent having a 50% distillation point of 300° C. or higher, the volatilization of the entire organic solvent is easily suppressed, and odor or the like is more difficult to generate. Further, when the second phase contains the organic solvent having a 50% distillation point of 300° C. or higher, the volatilization of the entire organic solvent is easily suppressed, and the clogging of nozzles of an ink jet recording apparatus can be suppressed.

1.2.2. Other Components

The second phase of the ink composition of the present embodiment may contain one or more kinds of additives that can be contained in a general ink jet ink, such as a pigment, a dye, a surfactant, a water-soluble organic solvent, a resin (dispersant), a preservative, a dissolution aid, an antioxidant, and an antifungal agent.

1.3. Ratio of First Phase and Second Phase and Other Phases

In the ink composition of the present embodiment, the ratio of the first phase to the total of the first phase and the second phase is not particularly limited, and, for example, can be set to 5 mass % to 95 mass %. The ink composition of the present embodiment has a form of emulsion or dispersion of the first phase and the second phase, and the phase separation structure thereof is stably maintained.

From the viewpoint of more stably maintaining the phase separation structure of the ink composition, the ratio of the first phase to the total of the first phase and the second phase is preferably 10 mass % to 80 mass %, more preferably 15 mass % to 70 mass %, and still more preferably 20 mass % to 60 mass %.

When the ink composition is formed by mixing the first phase and the second phase, some of the components contained in the first phase may be moved to the second phase, and some of the components of the second phase may be moved to the first phase.

Meanwhile, the ink composition of the present embodiment may have a third phase in addition to the first phase and the second phase. For example, in the case where an amphiphilic phase is formed in the vicinity of the interface of the first phase and the second phase, this amphiphilic phase may be regarded as a third phase.

1.4. Preparation of Ink Composition

The ink composition of the present embodiment has a form of emulsion or dispersion of the first phase and the second phase. For example, the ink composition can be prepared by putting the first phase and the second phase into an appropriate container, and stirring and dispersing the first phase and the second phase using ultrasonic dispersion, a high-pressure homogenizer, or an ultrahigh-pressure homogenizer, or stirring and dispersing the result product using a high-speed mixer, a sand mill, a bead mill, or a roll mill. In addition, the ink composition can be prepared by putting one phase (for example, second phase) into an appropriate container and dropping the other phase (for example, first phase) in a state of stirring the second phase using ultrasonic dispersion, a high-pressure homogenizer, or an ultrahigh-pressure homogenizer.

Whether or not the ink composition had an emulsion or dispersion form can be confirmed, for example, by visual observation. In the ink composition of the present embodiment, a change in the phase separation structure after preparation does not easily occur, and the form of emulsion or dispersion can be stably maintained.

In the ink composition of the present embodiment, the viscosity thereof can be easily set to a range suitable for an ink composition for ink jet recording. The viscosity of the ink composition of the present embodiment at 20° C. is 2 mPa·s to 20 mPa·s, preferably 2 mPa·s to 10 mPa·s, and more preferably 2 mPa·s to 7 mPa·s. The viscosity of the ink composition can be measured by reading the viscosity at a shear rate of 200 using a viscoelasticity testing machine MCR-300 (manufactured by Physica Inc.) under an environment of 20° C. while increasing the shear rate to 10 to 1000.

The viscosity of the ink composition mainly depends on the ratio of the first phase and the second phase, the composition of the second phase, and the dispersion structure (phase separation structure). Therefore, the ink composition is prepared by adjusting these conditions so as to be suitable for ink jet recording.

1.5. Effects and the Like

The ink composition of the present embodiment include a high-viscosity water-based pigment ink (first phase) containing 3 mass % to 15 mass % of a cellulose derivative and a second phase containing an organic solvent, thereby setting the viscosity of the ink composition to viscosity by which the ink composition can be stably ejected by an ink jet recording apparatus.

Thus, the fixability of a pigment becomes good, and high-quality ink jet recording can be performed. In addition, the ink composition of the present embodiment can stably maintain the form of emulsion or dispersion, and is thus excellent in storage stability.

Generally, in the case where a cellulose derivative is combined with a water-based ink composition, since the viscosity of the water-based ink composition at 20° C. becomes 20 mPa·s or more in the content of the cellulose derivative of about 1 mass %, it is difficult for this water-based ink composition to be used for ink jet recording. However, in the ink composition of the present embodiment, the cellulose derivative is combined with the first phase at a high concentration, and thus the content of the cellulose derivative is about 1 mass % (0.6 mass % or more) with respect to the total amount of the ink composition. Further, since the form of emulsion or dispersion is adopted by mixing the first phase and the second phase, it is possible to achieve a viscosity by which the ink composition can be stably ejected by an ink jet recording apparatus.

2. Examples

Hereinafter, the present invention will be described in detail based on Examples. However, the present invention is not limited to these Examples.

2.1. Preparation of Ink Composition

<Preparation of W phase>

W phase (first phase) was prepared as follows.

Each component was put into a container according to the composition shown in Table 1, mixed and stirred for 2 hours by a magnetic stirrer, and then filtered by a membrane filter having a pore size of 5 μm, so as to create a W phase. Here, each of the numerical values in Table 1 indicates mass %. As water, ion-exchange water was added such that the mass of the W phase is 100 mass %. After the preparation of the W phase, the viscosity of the W phase at a shear rate of 200 was read using a viscoelasticity testing machine MCR-300 (manufactured by Physica Inc.) under an environment of 20° C. while increasing the shear rate to 10 to 1000. The read values thereof are described in Table 1.

TABLE 1

| | | W1 | W2 | W3 | W4 | W5 | W6 | W7 | W8 | W9 | W10 | W11 | W12 |
|---|---|---|---|---|---|---|---|---|---|---|---|---|---|
| Pigment dispersion | | 50 | 50 | 50 | 50 | 50 | 50 | 50 | 50 | 50 | 50 | 50 | 40 |
| Cellulose derivative | Content | 5 | 5 | 5 | 5 | 10 | 5 | 1 | 5 | 5 | 10 | 10 | 20 |
| | Number average molecular weight | 30000 | 10000 | 30000 | 10000 | 10000 | 50000 | 50000 | 140000 | 140000 | 30000 | 50000 | 140000 |
| | Etherification degree | 0.8 | 0.8 | 0.65 | 0.65 | 0.65 | 1 | 1 | 1 | 1 | 1 | 0.65 | 1 |
| Glycerin | | 8 | 8 | 8 | 8 | 8 | 8 | 8 | 8 | 8 | 8 | 8 | 8 |
| Triethyleneglycol | | 5 | 5 | 5 | 5 | 5 | 5 | 5 | 5 | 5 | 5 | 5 | 5 |
| 1,2-hexanediol | | 5 | 5 | 5 | 5 | 5 | 5 | 5 | 5 | 5 | 5 | 5 | 5 |
| Trimethylolpropane | | 3 | 3 | 3 | 3 | 3 | 3 | 3 | 3 | 3 | 3 | 3 | 3 |
| Triethyleneglycol-monobutyl ether | | 10 | 10 | 10 | 10 | 10 | 10 | 10 | 10 | 10 | 10 | 10 | 10 |
| Olfine E1010 | | 0.5 | 0.5 | 0.5 | 0.5 | 0.5 | 0.5 | 0.5 | 0.5 | 0.5 | 0.5 | 0.5 | 0.5 |
| Surfynol 104 | | 0.5 | 0.5 | 0.5 | 0.5 | 0.5 | 0.5 | 0.5 | 0.5 | 0.5 | 0.5 | 0.5 | 0.5 |
| Triethanolamine | | 1 | 1 | 1 | 1 | 1 | 1 | 1 | 1 | 1 | 1 | 1 | 1 |
| Water | | 12 | 12 | 12 | 12 | 7 | 12 | 16 | 12 | 12 | 7 | 7 | 7 |
| Viscosity (mPa · s) | | 35 | 25 | 30 | 20 | 35 | 40 | 20 | 45 | 45 | 40 | 50 | 80 |

In Table 1, the components described as compound names were obtained as reagents. As the cellulose derivative, carboxymethylcellulose sodium (manufactured by DKS Co., Ltd.) was used. Further, trade names are as follows. Olfine E1010 (acetylene glycol-based surfactant, manufactured by Nissin Chemical Co., Ltd.) and Surfynol 104 (acetylene alcohol-based surfactant, manufactured by Air Products and Chemicals Inc.).

Further, as the pigment dispersion, a pigment dispersion prepared as follows was used. After 17 parts of a commercially-available acidic carbon black MA-100 (manufactured by Mitsubishi Chemical Corporation) was mixed well with 57 parts of water, 26 parts of sodium hypochlorite (effective chlorine concentration: 12%) was dropped into the mixture, followed by stirring at 100° C. to 105° C. for 10 hours, so as to obtain a slurry. The obtained slurry was filtered by Toyo Roshi filter paper No. 2 (manufactured by ADVANTEC Corporation), and was washed with water until pigment particles were leaked, so as to obtain a pigment wet cake. The pigment wet cake was redispersed in 3 kg of water, and was desalted by a reverse osmosis membrane until electric conductivity of 0.2 μS, so as to obtain a pigment dispersion. Further, this pigment dispersion was concentrated to a pigment concentration of 20 parts, so as to obtain a pigment dispersion containing a surface treatment type pigment having a carboxyl group introduced to the surface thereof as a functional group.

<Preparation of O Phase>

45 parts by mass of a naphthene-based solvent (AF-4, manufactured by Oil & Chemical Co., Ltd.), 15 parts by mass of a naphthene-based solvent (AF-6, manufactured by Oil & Chemical Co., Ltd.), 5 parts by mass of soybean oil methyl, 15 parts by mass of oleyl alcohol, and 5 parts by mass of an aliphatic hydrocarbon-based solvent (Exxol D80, manufactured by Exxon Corporation) were mixed (total 85 parts by mass) and put into a container, mixed and stirred for 2 hours by a magnetic stirrer, and then filtered by a membrane filter having a pore size of 5 μm, so as to prepare an O phase. After the preparation of the O phase, the viscosity of the O phase at a shear rate of 200 was read using a viscoelasticity testing machine MCR-300 (manufactured by Physica Inc.) under an environment of 20° C. while increasing the shear rate to 10 to 1000. The read value thereof was 5 mPa·s.

<Preparation of Ink Composition>

100 ml of the above O phase was put into a 300 ml beaker, and was stirred at 5000 rpm by a high-speed homogenizer (Physcotron, manufactured by Microtec Co., Ltd.). The above W phase was dropped into the O phase while stirring the O phase, so as to mix the O phase and the W phase at a W ratio (mass of W phase/(mass of W phase+mass of O phase)) shown in Table 2. After the dropping, stirring was further carried out for 5 minutes at a rotation speed of 20000 rpm by the same homogenizer, so as to obtain the ink composition of each example. After the preparation of the ink composition, the viscosity of the ink composition at a shear rate of 200 was read using a viscoelasticity testing machine MCR-300 (manufactured by Physica Inc.) under an environment of 20° C. while increasing the shear rate to 10 to 1000. The read values thereof are described in Table 2.

TABLE 2

| | Examples | | | | | | | | | | | | | | | | | Comparative Examples | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 1 | 2 | 3 |
| W phase used | W1 | W2 | W3 | W4 | W1 | W2 | W3 | W4 | W1 | W2 | W3 | W4 | W6 | W8 | W10 | W5 | W11 | W12 | W7 | W9 |
| W phase cellulose derivative mass % | 5 | 5 | 5 | 5 | 5 | 5 | 5 | 5 | 5 | 5 | 5 | 5 | 5 | 5 | 10 | 10 | 10 | 0 | 1 | 20 |
| W ratio (W/(W + O)) | 20 | 20 | 20 | 20 | 40 | 40 | 40 | 40 | 60 | 60 | 60 | 60 | 30 | 50 | 20 | 20 | 60 | 20 | 20 | 20 |
| Viscosity (mPa · s) | 6 | 5 | 5 | 5 | 8 | 10 | 10 | 10 | 15 | 18 | 18 | 18 | 18 | 20 | 18 | 7 | 20 | 4 | 5 | 20 |
| Emulsion stability | A | A | A | A | A | A | A | A | A | A | A | A | A | A | A | A | A | C | B | A |
| Ejection stability | A | A | A | A | A | A | A | A | B | B | B | B | B | B | B | A | B | C | B | C |

TABLE 2-continued

|  | Examples | | | | | | | | | | | | | | | | | Comparative Examples | | |
| --- | --- | --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 | 17 | 1 | 2 | 3 |
| OD value evaluation | A | B | A | B | A | A | A | A | A | A | A | A | A | A | A | A | A | C | B | C |
| Offset evaluation | A | A | A | A | A | A | A | A | A | A | A | A | A | A | A | A | A | C | C | A |
| Fixability evaluation | A | A | B | B | A | A | B | B | A | A | B | B | A | A | A | B | A | C | C | A |
| Curl evaluation | A | A | A | A | B | B | B | B | C | C | C | C | A | B | A | A | C | A | A | A |

2.2. Evaluation Test

The ink composition of each example shown in Table 2 was evaluated as follows.

<<Evaluation of Stability of Emulsion>>

The ink composition was left at 60° C. for 24 hours, returned to room temperature, and then the absorbance thereof was measured. Evaluation criteria are as follows, and the results thereof are described in Table 2.

A: deviation from the initial is within 3%
B: deviation from the initial is within 10%
C: deviation from the initial is more than 10%

<<Ejection Stability>>

After it was confirmed that the prepared ink composition was introduced into a cartridge of an ink jet printer (type PX-B700, manufactured by Seiko Epson Corporation) and ejected from a plurality of nozzles communicated with the cartridge, a test pattern was continuously printed on 30 sheets of A4 size paper, and then nozzle checking was carried out after printing of 30 sheets, so as to evaluate ejection stability according to the following criteria. The evaluation results are described in Table 2.

A: no nozzle clogging
B: nozzle clogging occurs within five nozzles, recovered by cleaning once
C: nozzle clogging occurs within ten nozzles, recovered by cleaning two or more times <<OD Value>>

After it was confirmed that the prepared ink composition was introduced into a cartridge of an ink jet printer (type PX-B700, manufactured by Seiko Epson Corporation) and ejected from a plurality of nozzles communicated with the cartridge, a solid pattern was printed on one sheet of A4 size paper (plain paper: Xerox P paper, manufactured by Fuji Xerox Co. Ltd.). And, the OD value of the pattern was measured by a Gretag densitometer (manufactured by Gretag Macbeth Co., Ltd.). Evaluation criteria are as follows. The results are described in Table 2.

A: OD value is 1.2 or more
B: OD value is 1.0 or more and less than 1.2
C: OD value is less than 1.0

<<Offset>>

The OD value of the backside of the A4 size paper used in the measurement of the above OD value was measured in the same manner as above. Evaluation criteria are as follows. The results are described in Table 2.

A: OD value is less than 0.2
B: OD value is 0.2 or more and less than 0.3
C: OD value is 0.3 or more <<Fixability>>

After it was confirmed that the prepared ink composition was introduced into a cartridge of an ink jet printer (type PX-B700, manufactured by Seiko Epson Corporation) and ejected from a plurality of nozzles communicated with the cartridge, a test pattern was printed on one sheet of A4 size paper (plain paper: Xerox P paper, manufactured by Fuji Xerox Co. Ltd.), and left for 10 minutes. Then, a line was drawn on the printed portion using a fluorescent pen. At this time, a load of 220 g was imposed on the fluorescent pen. Evaluation was visually carried out, and evaluation criteria are as follows. The evaluation results are described in Table 2.

A: no bleeding
B: bleeding slightly occurs
C: bleeding seriously occurs such that the tail of character is drawn <<Curl>>

After it was confirmed that the prepared ink composition was introduced into a cartridge of an ink jet printer (type PX-B700, manufactured by Seiko Epson Corporation) and ejected from a plurality of nozzles communicated with the cartridge, a solid pattern was printed on one sheet of A4 size paper (plain paper: Xerox P paper, manufactured by Fuji Xerox Co. Ltd.), and the curl height at the time of discharging the paper (the maximum height (spaced distance) of the paper from the conveying surface of the paper) was measured. Evaluation criteria are as follows. The results are described in Table 2.

A: less than 5 mm
B: 5 mm or more and less than 10 mm
C: 10 mm or more 2.3. Evaluation Results As the evaluation results of Table 2, it was found that all of the ink compositions according to Examples can be stably stored, and the viscosity thereof is kept low, and thus these ink compositions can be applied to an ink jet recording apparatus. Therefore, according to the present invention, it was found that these ink compositions can be adjusted to have viscosity suitable as an ink for ink jet recording in spite of containing a cellulose derivative at a high concentration.

Further, all of the ink compositions according to Examples got good results in OD value, offset, and fixability. It is considered that this result is caused by the fact that the pigment contained in the W phase is difficult to move along with the penetration into the paper of the O phase. That is, it is considered that this result is caused by the fact that the pigment of the W phase is fixed by the relatively high-concentration cellulose derivative of the W phase, and is not easily influenced by the flows caused by the penetration at the time of adherence of the ink composition to the paper. Moreover, it is considered that this result is caused by the fact that, since the affinity of the cellulose derivative to the paper is high, after the ink composition adheres to the paper, the paper and the pigment are early bounded to each other.

Comparing Examples with each other, it was found that the fixability tends to become better when the etherification degree of the cellulose derivative is high, and that the OD value tends to become good when the number average molecular weight of the cellulose derivative is large. Further, it was observed that the curl properties correlate with the W ratio.

The invention can be variously modified without being limited to the above-mentioned embodiments. For example, the invention includes substantially the same configurations as those described in the embodiments (for example, configurations having the same function, method and result or configurations having the same object and effect). The invention includes configurations that replace non-essential parts of the configurations described in the embodiments. The invention includes configurations that can achieve the same action and effect as those described in the embodiments or the same purpose as the configurations described in the embodiments. The invention includes configurations obtained by applying known technologies to the configurations described in the embodiments.

The entire disclosure of Japanese Patent Application No. 2014-253836, filed Dec. 16, 2014 is expressly incorporated by reference herein.

The invention claimed is:

1. An ink composition for ink jet recording, comprising:
a first phase containing a pigment, a cellulose derivative, and water; and
a second phase containing an organic solvent having a 50% distillation point of 280° C. or lower,
wherein the content of the cellulose derivative in the first phase is 3 mass % to 15 mass % with respect to the total mass of the first phase; and
wherein the etherification degree of the entire cellulose derivative is 0.6 to 1.0.

2. The ink composition according to claim 1,
wherein the cellulose derivative is at least one selected from carboxymethyl cellulose and salts thereof, hydroxyethyl cellulose, hydroxypropyl cellulose, and methyl cellulose.

3. The ink composition according to claim 1,
wherein the ratio of the first phase to the total of the first phase and the second phase is 20 mass % to 60 mass %.

4. The ink composition according to claim 2,
wherein the ratio of the first phase to the total of the first phase and the second phase is 20 mass % to 60 mass %.

5. The ink composition according to claim 1,
wherein the second phase contains an organic solvent having a 50% distillation point of 300° C. or higher.

6. The ink composition according to claim 2,
wherein the second phase contains an organic solvent having a 50% distillation point of 300° C. or higher.

7. The ink composition according to claim 3,
wherein the second phase contains an organic solvent having a 50% distillation point of 300° C. or higher.

8. The ink composition according to claim 4,
wherein the second phase contains an organic solvent having a 50% distillation point of 300° C. or higher.

9. The ink composition according to claim 1,
wherein the number average molecular weight of the entire cellulose derivative is 10,000 to 150,000.

10. The ink composition according to claim 2,
wherein the number average molecular weight of the entire cellulose derivative is 10,000 to 150,000.

11. The ink composition according to claim 3,
wherein the number average molecular weight of the entire cellulose derivative is 10,000 to 150,000.

12. The ink composition according to claim 4,
wherein the number average molecular weight of the entire cellulose derivative is 10,000 to 150,000.

13. The ink composition according to claim 5,
wherein the number average molecular weight of the entire cellulose derivative is 10,000 to 150,000.

14. The ink composition according to claim 6,
wherein the number average molecular weight of the entire cellulose derivative is 10,000 to 150,000.

15. The ink composition according to claim 7,
wherein the number average molecular weight of the entire cellulose derivative is 10,000 to 150,000.

16. The ink composition according to claim 8,
wherein the number average molecular weight of the entire cellulose derivative is 10,000 to 150,000.

\* \* \* \* \*